US010143995B2

(12) United States Patent
Kamler

(10) Patent No.: US 10,143,995 B2
(45) Date of Patent: Dec. 4, 2018

(54) FLOW-THROUGH REACTION CONTAINMENT APPARATUS EMBODIED AS A MONOLITHIC BLOCK OF MATERIAL

(71) Applicant: University of Alaska Fairbanks, Fairbanks, AK (US)

(72) Inventor: Jonathan Walter Kamler, Auke Bay, AK (US)

(73) Assignee: University of Alaska Fairbanks, Fairbanks, AK (US)

( * ) Notice: Subject to any disclaimer, the term of this patent is extended or adjusted under 35 U.S.C. 154(b) by 434 days.

(21) Appl. No.: 14/729,490

(22) Filed: Jun. 3, 2015

(65) Prior Publication Data

US 2016/0354756 A1 Dec. 8, 2016

(51) Int. Cl.
*B01J 19/24* (2006.01)
*B01J 4/00* (2006.01)

(52) U.S. Cl.
CPC .......... *B01J 19/2485* (2013.01); *B01J 4/001* (2013.01); *B01J 2219/2403* (2013.01); *B01J 2219/244* (2013.01); *B01J 2219/2411* (2013.01); *B01J 2219/2434* (2013.01); *B01J 2219/2438* (2013.01)

(58) Field of Classification Search
CPC ........ B01J 19/2485; B01J 3/042; B01J 3/044; B01J 2219/2433; B01J 2219/2435; B01J 2219/2437; B01J 2219/2438; B01J 2219/244; B01J 2219/2403; B01J 2219/2411; F28D 7/022

See application file for complete search history.

(56) References Cited

U.S. PATENT DOCUMENTS

| 4,711,298 A | * | 12/1987 | Rogier | ...................... F28F 7/02 165/165 |
| 5,980,838 A | * | 11/1999 | von Hippel | .............. B01J 4/001 422/198 |

* cited by examiner

*Primary Examiner* — Lessanework Seifu
(74) *Attorney, Agent, or Firm* — Ballard Spahr LLP

(57) ABSTRACT

This monolithic reactor is an adaptable and scalable, flow-through reaction containment apparatus embodied as a one-piece monolithic block of material that retains re-configurability to improve reaction processing. This apparatus increases operational flexibility, adaptable design, and vastly simplifies construction of tubular reaction-containment configurations. Internally, the monolithic block comprises one or more closely spaced, functional voids which operate as fluid channels that can be configured in various geometric arrangements. The apparatus is widely scalable, provides high thermodynamic efficiency, manufacturing simplicity, and affordability for varied operations through additive manufacturing, and has a compact physical footprint.

20 Claims, 18 Drawing Sheets

Figure 1:
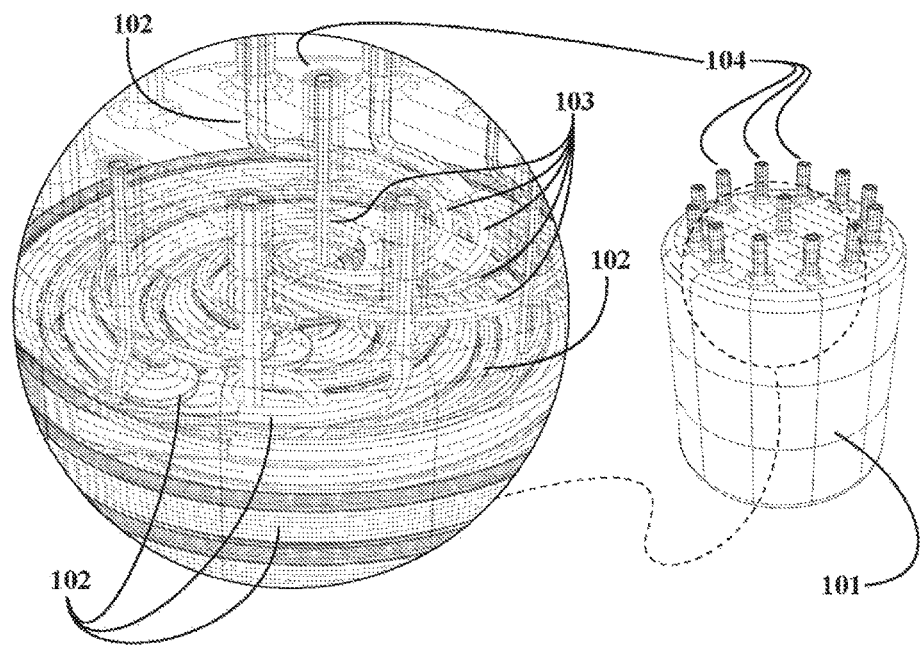

FLOW-THROUGH REACTION CONTAINMENT APPARATUS EMBODIED AS A MONOLITHIC BLOCK OF MATERIAL

BACKGROUND

Traditional flow-through reactors maximize both the efficacy of the reaction and the heat transferred during reactions by relying on complex tubal configurations. These configurations have historically been intertwined or adjoining, and consequently have suffered poor heat transfer efficiency, considerable heat loss, and reaction inefficiencies. Formidable engineering challenges and high construction costs associated with nesting tubes within one another have presented difficult reactor design barriers and consequently required thick tube walls, long tube runs, large footprints, and extended reaction residence times. This apparatus solves these issues with unique tubular configurations that allow the reactor to be constructed as a monolithic unit, with tube-like channels nestled within each other to maximize heat transfer, efficiency, and reaction speed while minimizing the overall size of the reactor needed for the application.

SUMMARY

The monolithic block can advantageously embody any shape, including cylindrical, prismatically rectangular (i.e., six flat sides resembling a box), conical, spherical, geodesic, or other suitable geometric form. One exemplary embodiment substantially comprises a cylindrical geometry made from a single piece of material with the axis running from the center of one flat end to the center of the other. The preferred construction method would be additive manufacturing (also known as 3D printing) but manufacturing methods, such as investment casting, lost-wax casting, or gel casting, could also be used to manufacture the apparatus. Additive manufacturing allows the monolithic block and the internal fluid channels to be fabricated as a single piece without machining.

An exemplary embodiment of channel arrangements would be three channels oriented in a triangular geometry around a fourth, main reaction channel, with the three channels generally running parallel to the path of the fourth channel. The four-channel arrangement is replicated in a generally hexagonal arrangement around a fifth (preheating) channel. Internal flow channels in an exemplary, cylindrical monolithic embodiment consist of concentrically arranged axially helical coils or axial oscillations that connect annularly, thereby forming continuous serpentine paths. Helical coils are substantially arranged in annular rings situated concentrically around the monolith axial center. The monolithic structure and internal annularly arranged serpentine channels efficiently and advantageously pack very long tubular reaction zones into a compact form factor.

Customized channel, cross-sectional profiles allow for unique proximal channel arrangements and orientations to capitalize on fluidic isothermal conditions and energetic dispersion. Notably, rather than being tubes that have been bent and coiled into shape, channels are linear voids in the monolithic block with definable geometries, including cross-sectional shapes, rotational pitch, area, and diameter. Channel geometries can be constant or varied along their linear paths. However, all channels in the shown embodiments maintain substantially constant relative geometries including axiality, concentricity, annularity, and radiality across the monolithic space with the exception that substantially round geometries are used for all channels at the inlet and outlet ports).

One embodiment herein orients three channel profiles around a fourth in an equilateral triangular arrangement, with variants thereof. Another embodiment situates four channel profiles around a fifth, substantially creating a square arrangement, again with several possible variants. Yet another embodiment encircles one or more channel profiles around a central profile in a circular arrangement, likewise with numerous variants. Other increasing numbers of channel-profile orientations are also possible (e.g., hexagonal, octagonal, etc.) Specific operational needs or design specifications may be addressed by mixing and matching geometric channel arrangements in various combinations or permutations such as, for example, a square or triangular assemblage may surround an assemblage of circular-profile channels which further surround a round channel at the center. Regardless of which geometric orientation is used, each collinear multiple-channel assemblage set collectively functions as a parallel geometric package, wherein the channels maintain proximally precise, cross-sectional distances to each other along their collective linear paths. There is no preferred embodiment in terms of the number of channels, individual profile shapes, or geometric channel orientations due to the fact that different designs can serve many purposes.

Interlocking and overlapping profile embodiments offer especially advantageous benefits in fissile applications, wherein such overlaps force escaping neutrons or other irradiative energetics to pass through surrounding breeder and moderator fluids. Indeed, overlapping or interlocking profiles ensure that there is no direct, straight-line efferent path from the neutron-producing fluid to the outer surface without bisecting moderating fluids. Consequently, the likelihood of neutrons being captured by surrounding fluids increases, thereby increasing moderation and breeding efficiency and reducing shielding requirements. Furthermore, the fluid channels can advantageously inhibit wear and avoid galling common in traditional fissile applications, due to the fact that the reactor proposed herein requires no moving parts which could jam or gall. Furthermore, said fluids may be dynamically varied in terms of density, composition, or flow rates in order to dynamically calibrate moderation and control characteristics eliminating the need for moving parts.

Several independent helical layers of fluid channels allow reactant and product mixtures to isothermally evolve through the reaction space in a uniform manner, thereby promoting highly efficient isothermal operation and low pressure losses along the channels. The apparatus allows temperature-gradient regulations across successive annular channel sections via heat transfer to educts prior to mixing and heat extraction from products prior to discharge. Educt and product flow rates can be varied in order to control and optimize beat transfer between fluids within the channel structure. Closely spaced channels fill the entirety of the available monolithic block, thereby providing precise, uniform, and accurate isothermal control throughout the monolithic space. Uniform isothermal distribution throughout the monolith minimizes localized thermal spikes or hot spots.

BRIEF DESCRIPTION OF THE. DRAWINGS

Figure 2:
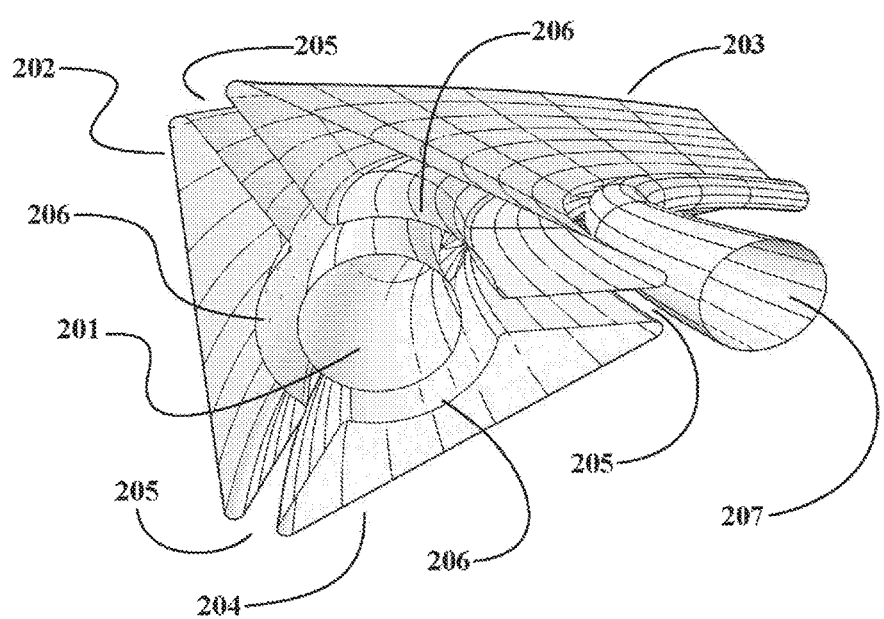
Figure 3:
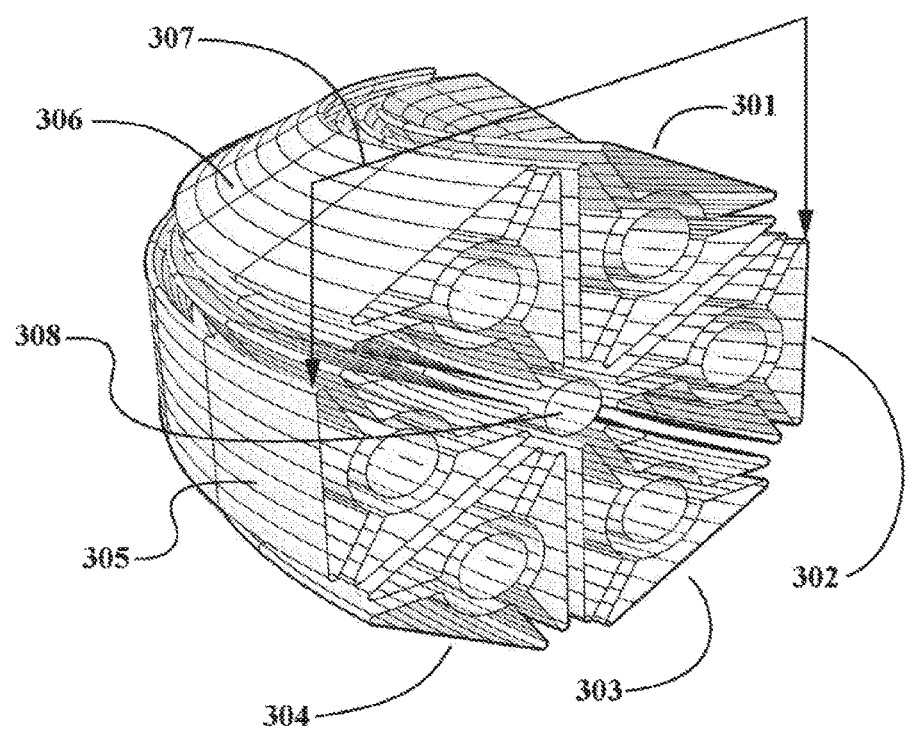
Figure 4:
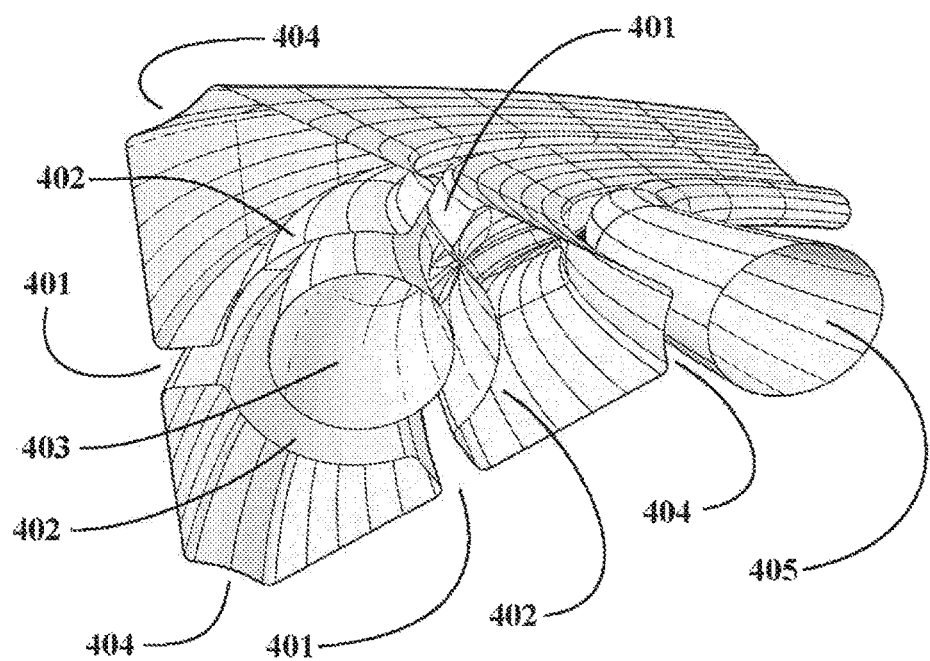
Figure 5:
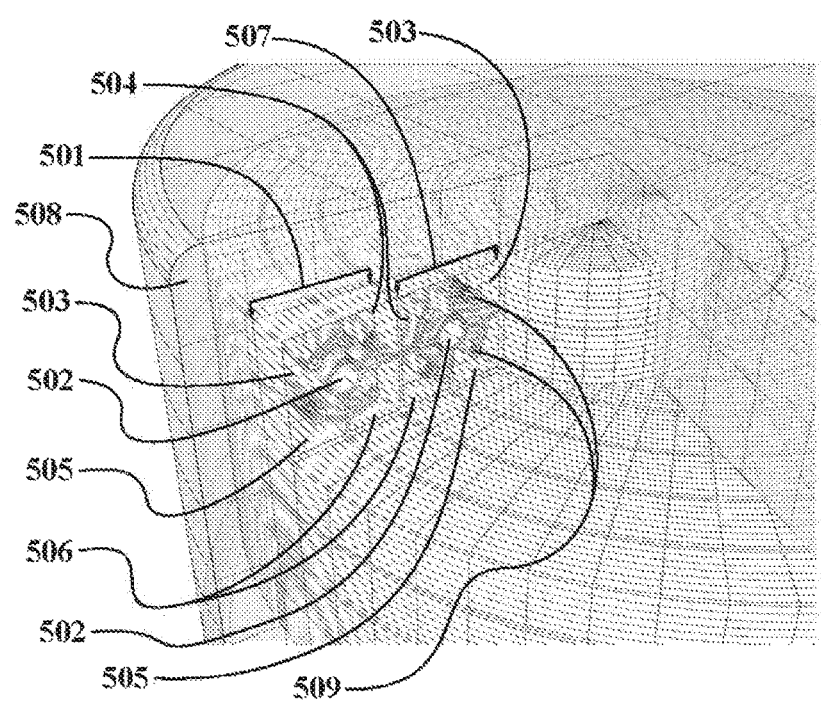
Figure 6:
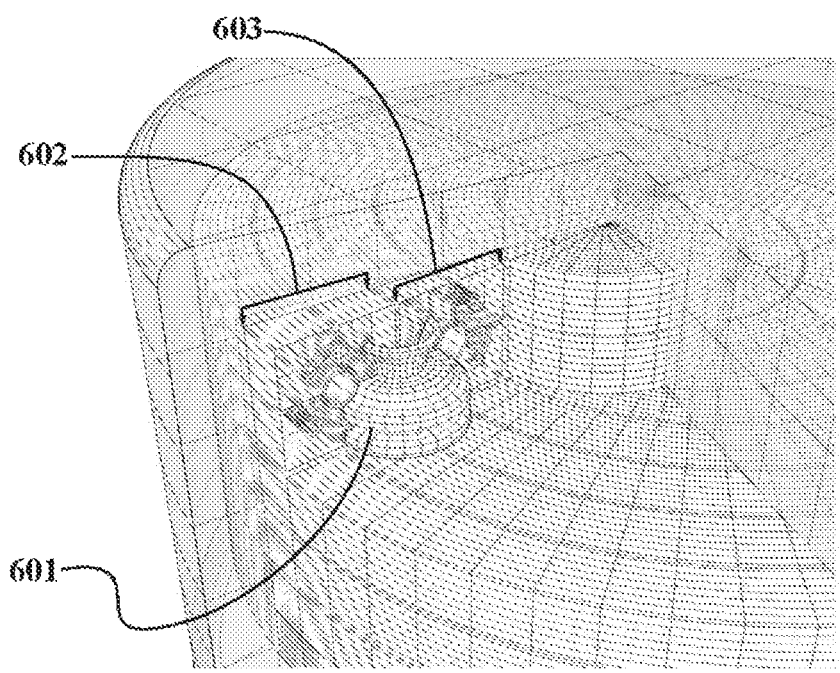
Figure 7:
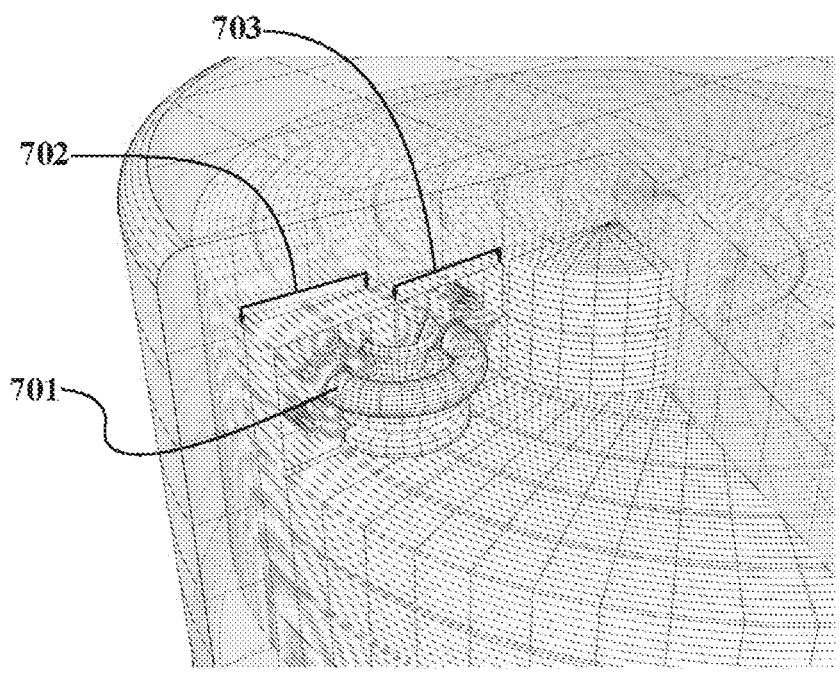
Figure 8:
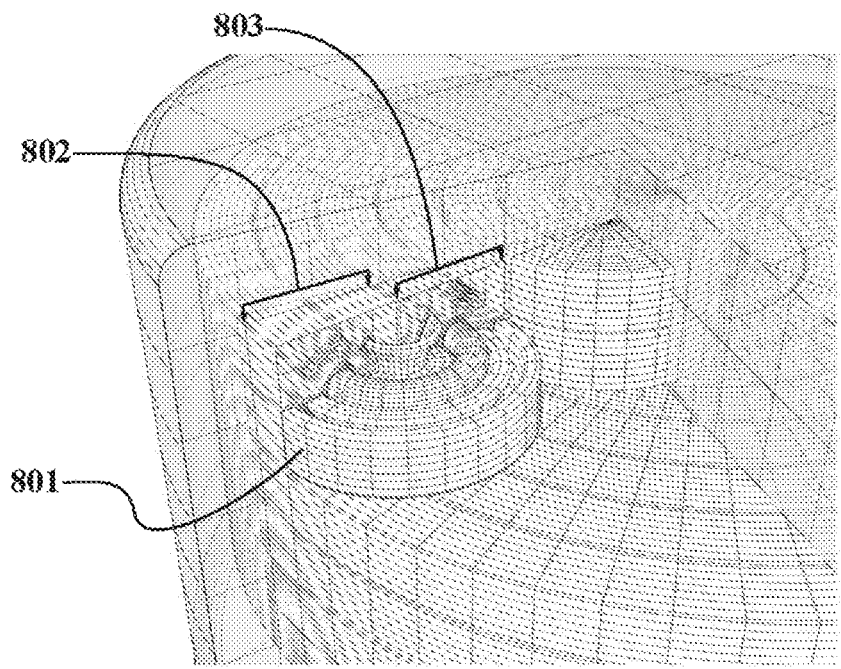
Figure 9:
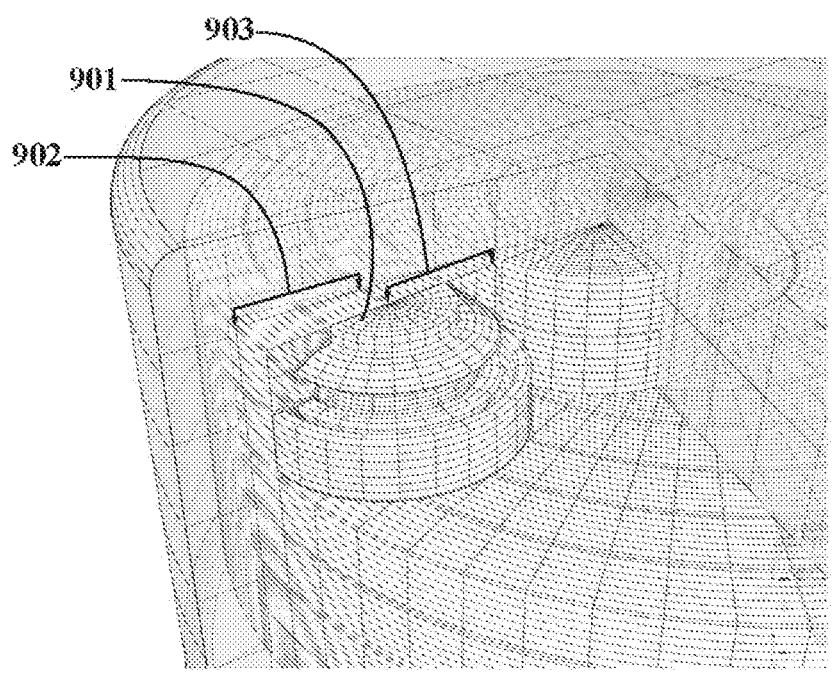
Figure 10:
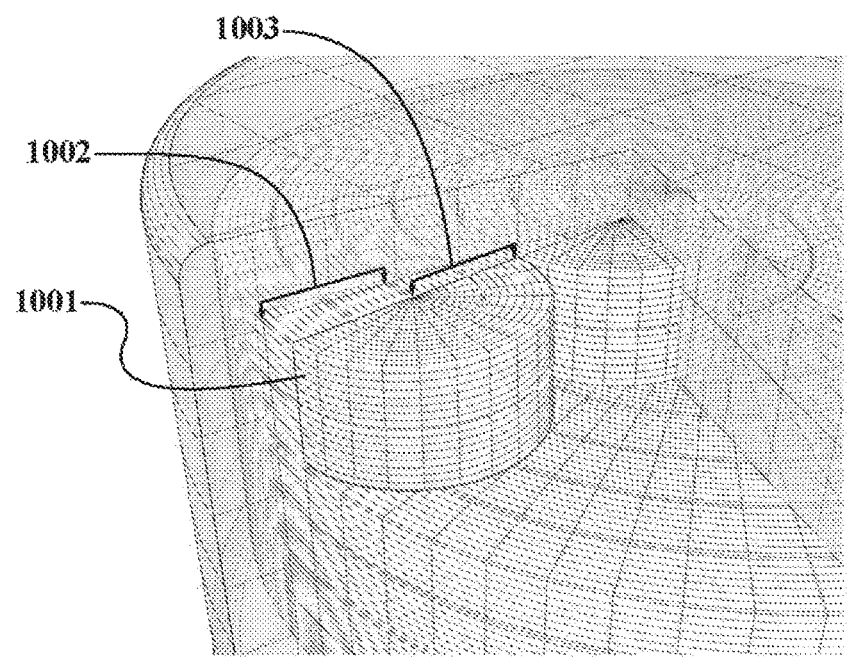
Figure 11:
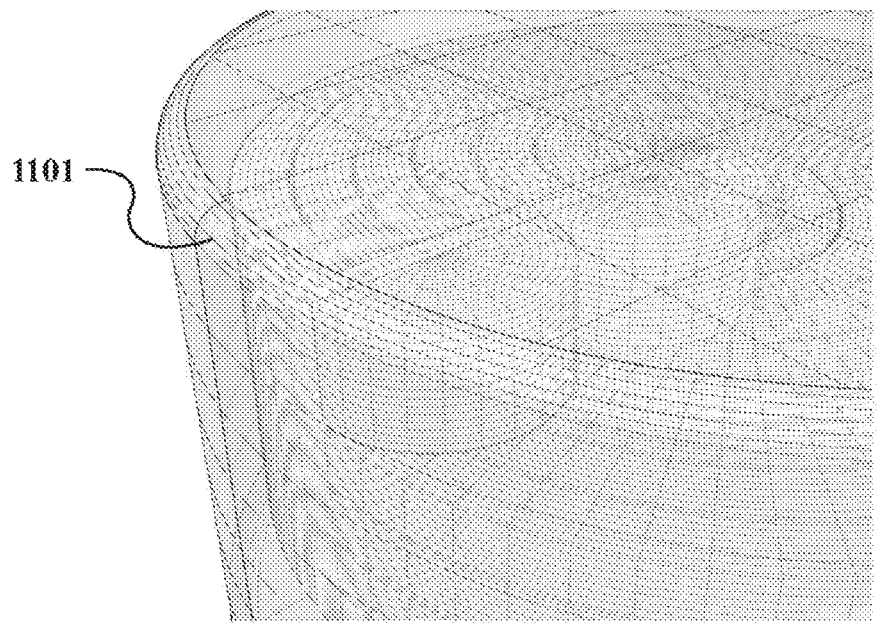
Figure 12:
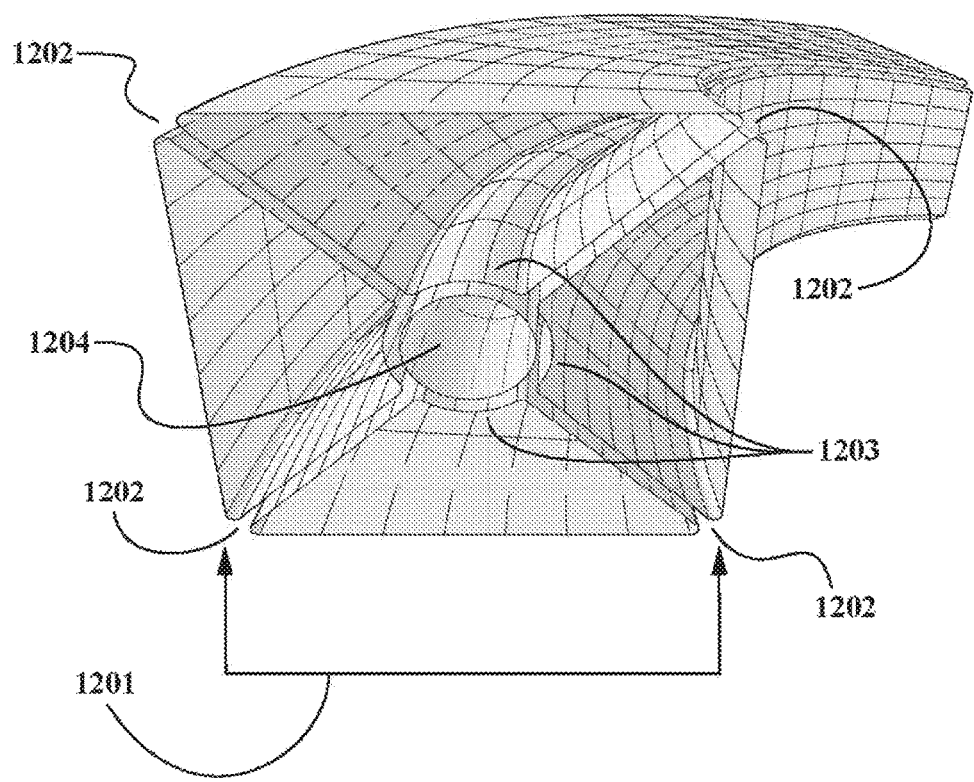
Figure 13:
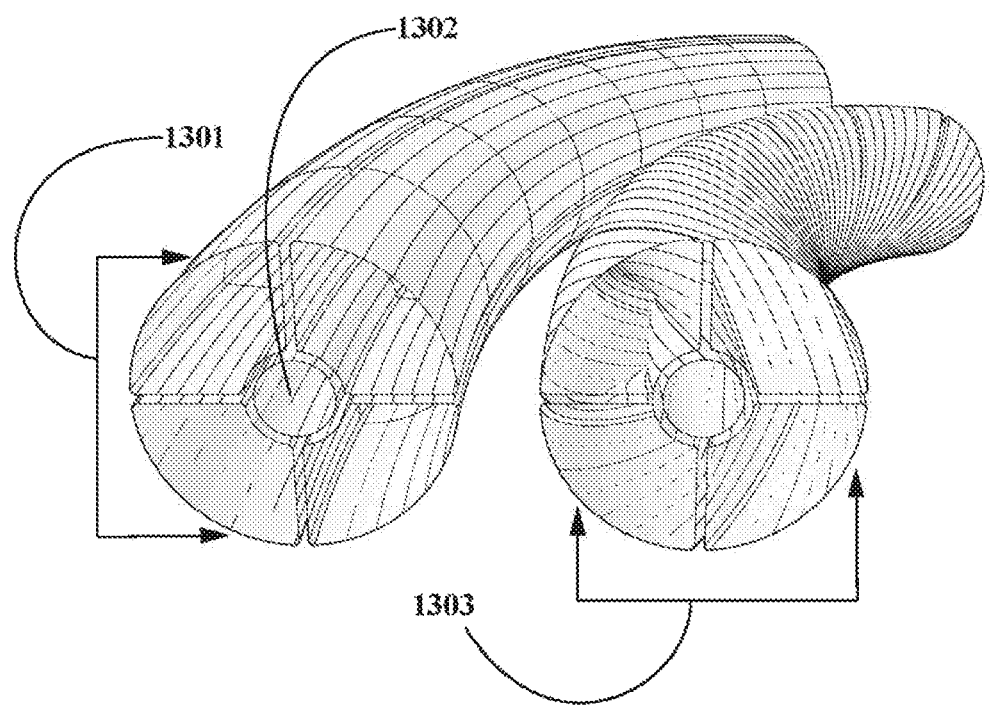
Figure 14:
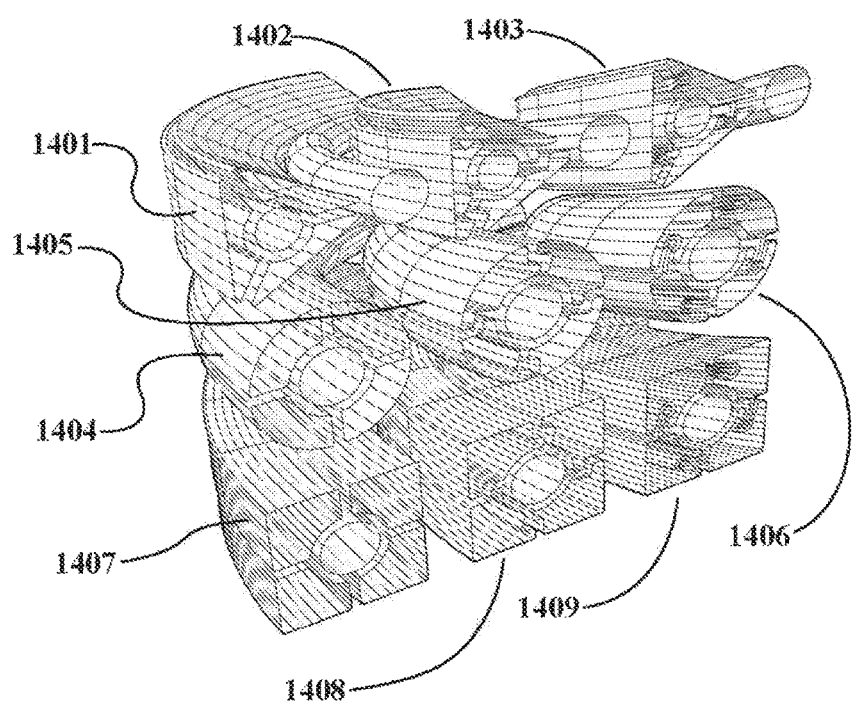
Figure 15:
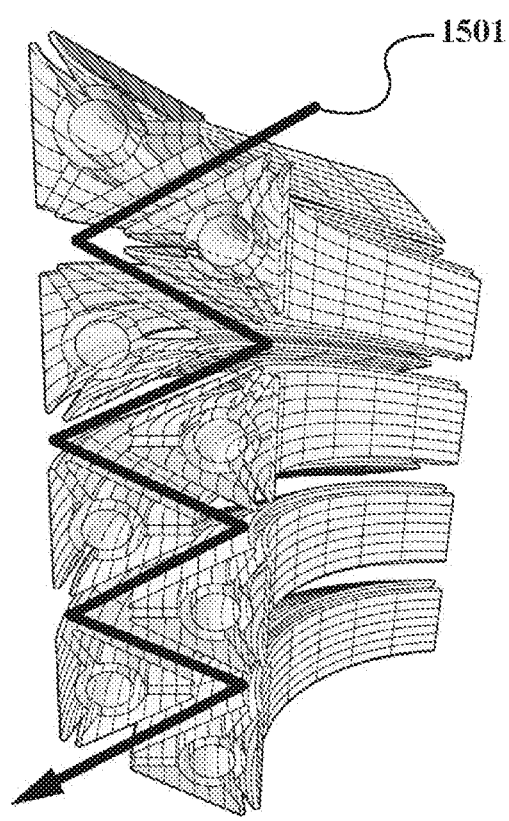
Figure 16:
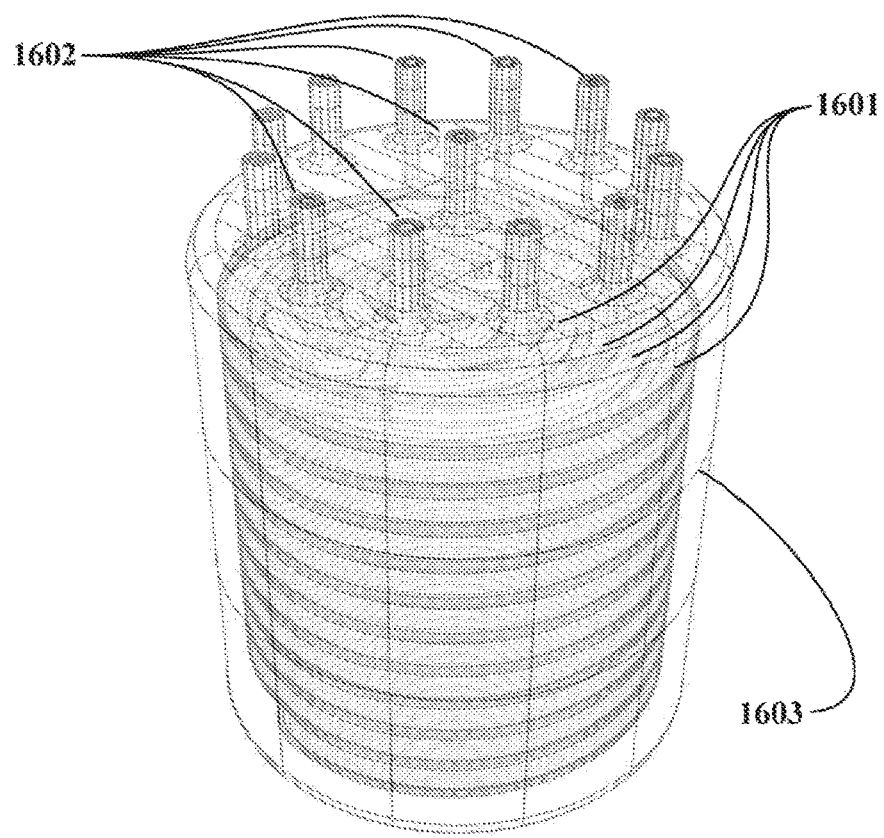
Figure 17:
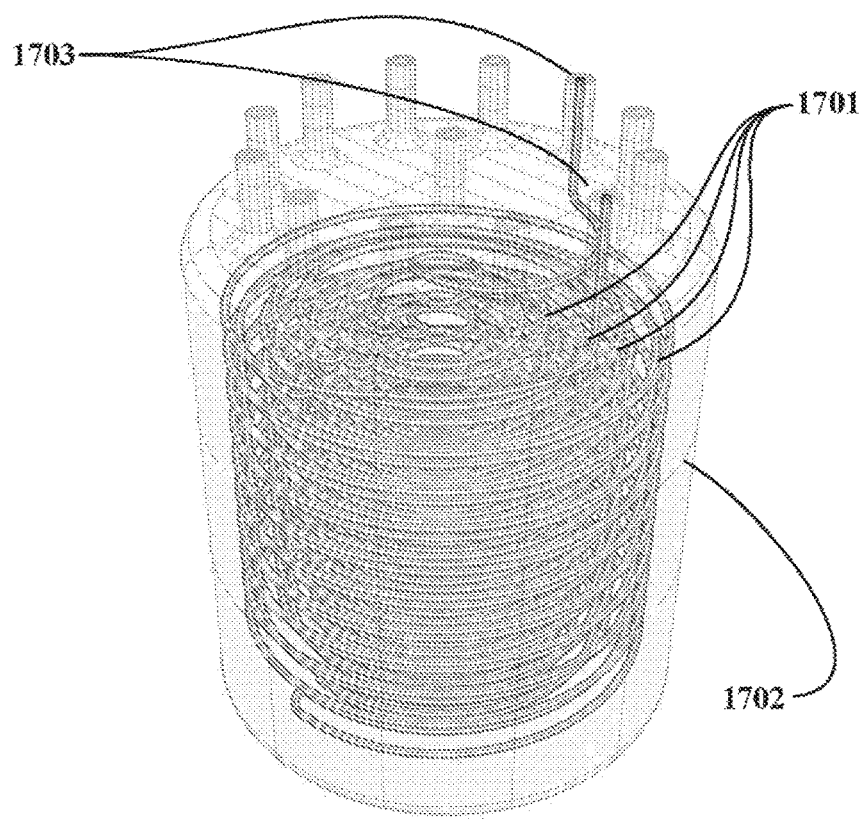
Figure 18:
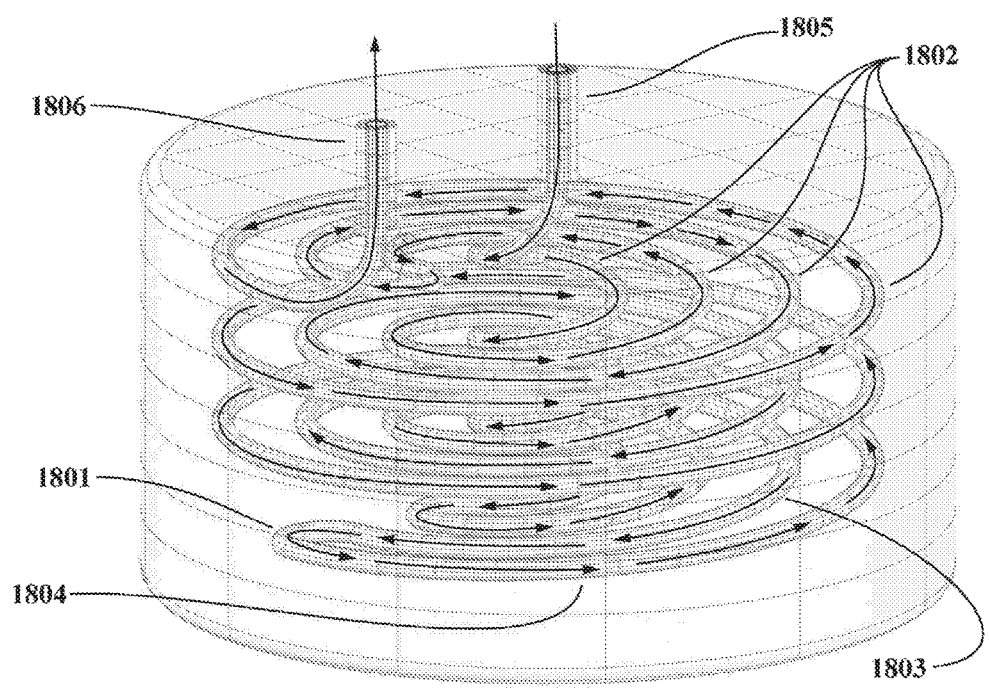

The accompanying drawings, which are incorporated in and constitute a part of this specification, illustrate embodiments and together with the description, serve to explain the apparatus:

a. FIG. 1 is a diagram showing the monolith body with exemplary inlet and outlet ports and an inset showing internal functional voids, which serve as fluid channels;

b. FIG. 2 is a diagram showing three (surrounding) channels oriented in a equilateral triangular geometry (divided at the triangle vertices) around a fourth main reaction channel and proximal to a fifth (preheating) channel;

c. FIG. 3 is a diagram showing six triangular-four-channel assemblages shown in FIG. 2 are oriented in a hexagonal pattern around the preheating channel;

d. FIG. 4 is a diagram showing a variant of the embodiment in FIG. 2, wherein the three (surrounding) channels of the equilateral triangular geometry are divided amid the triangle sides;

e. FIG. 5 is a diagram showing an apparatus with four (surrounding) channels oriented in a square geometry around a fifth, main reaction channel;

f. FIG. 6 is a diagram showing the enclosure of the channel pass configurations of FIG. 5;

g. FIG. 7 is a diagram showing the connection of the fifth, main reaction channel of FIG. 5, and also reflecting the internals of one of the four surrounding channels; and h. FIG. 8 is a diagram showing the internals of two of the four surrounding channels of FIG. 5;

i. FIG. 9 is a diagram showing the internals of three of the four surrounding channels of FIG. 5 and the connection of the fifth, main reaction channel; and j. FIG. 10 is a diagram showing the internals of all four surrounding channels of FIG. 5 and the connection of the fifth, main reaction channel; and k. FIG. 11 is a diagram showing the enclosure within the monolithic reactor body of the four surrounding channels and the fifth, main reaction channel of FIG. 5.

l. FIG. 12 is a diagram showing a variant of the square embodiment in FIGS. 5-11, wherein the square assemblage of channels is divided at the vertices rather than along the sides;

m. FIG. 13 is a diagram showing side-by-side comparison of exemplary helically twisting and non-twisting circular-profile channel configurations;

n. FIG. 14 is a diagram showing various exemplary channel profiles, including triangular, circular, square, overlapping, and interlocking channel configurations;

o. FIG. 15 is a diagram showing overlapping (thread-like) annular structure favored by triangular channel assemblage arrangements;

p. FIG. 16 is a diagram showing closely packed annular channel structure illustrating that an even number of annular layers results in input and output ports on the same end of the apparatus;

q. FIG. 17 is a diagram showing long continuous channel structure, compact arrangement, and respective, channel-specific input and output ports;

r. FIG. 18 is a diagram showing oscillatory flow direction change between annular channel layers.

DETAILED DESCRIPTION (W/REFERENCES TO DRAWINGS)

Before the present apparatus is disclosed and described, it is to be understood that the apparatus is not limited to specific configurations, or to particular implementations. It is also to be understood that the terminology used herein is for the purpose of describing particular embodiments only and is not intended to be limiting.

As used in the specification and the appended claims, the singular forms "a," "an" and "the" include plural counterpart unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," the approximation values form another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers, or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutation of these may not be explicitly disclosed, each is specifically contemplated and described herein, for all apparatus configurations.

The present apparatus may be understood more readily by reference to the following detailed description of exemplary embodiments and the specific features included therein and to the Figures and their previous and following description.

As will be appreciated by one skilled in the art, the apparatus may take the form of any embodiment. Exemplary embodiments of the apparatus are described below with reference to illustrations of varied configurations.

The apparatus as shown in FIG. 1 comprises a one-piece, monolithic block 101 of material (e.g., metal, ceramic, plastic, or other similar/suitable constituents) constituting the body fabricated as a single piece. The inset shows exemplary internal details of the monolithic body, wherein two or more internal functional voids 102 (five in this embodiment 103) which act as fluid channels. Each of the functional voids have separate inlet and outlet ports 104 allowing continuous, unobstructed fluid flow. The functional voids adjoin one another in a tightly spaced, collinear, parallel manner 102, 103 in order to maximize efficiency and minimize the size of the apparatus.

One exemplary embodiment of the apparatus as shown in FIG. 2 comprises triangular-profile assemblage of channels including a central channel (i.e., main reaction mixing) 201, with the three surrounding collinear channels 202, 203, 204 arranged in an equilateral triangular pattern. The triangular pattern is divided at each of the three vertices 205, thereby creating three triangular channels, but may in other embodiments be subdivided differently to produce more or fewer than three channels. The main reaction channel 201 can be any suitable cross-sectional shape that fits the space, but is circular to exhibit the lowest friction resistance and be least prone to scaling and plugging. The three sides or divisions of the triangle in this embodiment comprise three separate channels 202-04 oriented collinearly and generally parallel to the main reaction channel. Rounded recesses 206 in each of the three surrounding channels accommodate close spacing with the center main channel 201. Collectively, the four channels function as a single unit, wherein they self-dictate that the three outer channels of the triangle be geometrically non-standard, cross-sectional shapes (albeit each of the channels can be identical and are so in the embodiment shown). The three channels comprising the sides of the triangle in this embodiment may carry various fluids including reactant educts, slurries, oxidants, energy-exchange fluids, ionic fluids, molten metals, molten salts, or other suitable reactants. The four-channel assemblage is situated adjacent to a fifth channel 207 that can serve any of a number of functions. As shown in FIG. 3, up to six sets of triangular collinear channel assemblages 301, 302, 303, 304, 305, 306 in this embodiment may hexagonally 307 orient (or partly so) around a fifth channel 308. The fifth channel 308 has several potential functions including preheating, secondary reaction containment, thermal pretreatment path, emergency cooling, thermal expansion, or monolith auxiliary thermal regulation.

One simple variant of the triangular-profile embodiment as shown in FIG. 4 divides the equilateral triangular pattern at the middle of each side 401 rather than at the vertices, thereby differentiating the three separate outer channels as three trapezoidal-shaped channels. Other than the notable change in individual channel shape, the channel assemblage has the same, general triangular appearance as the embodiment discussed above. Rounded recesses 402 are scalloped from each of the three surrounding channels to accommodate close spacing with the center main channel 403. Rounded recesses 404 are also scalloped from each of the triangle-assemblage vertices to accommodate close spacing with any adjoining pass of the fifth channel 405.

A second exemplary embodiment as shown in FIG. 5 includes a collinear annulus assemblage 501 of five channels 503, 504, 505, 506 proximally positioned in a square-profile arrangement, with variants thereof. The main reaction-mixing channel 502 is aligned at the center of the square assemblage with four surrounding generally square channels 503-506. The base of each surrounding channel form one side of the square. The four outer surrounding channels 503-506 are, therefore, oriented collinearly parallel to the main reaction channel 502. The four outer surrounding channels each have round recesses to accommodate close spacing with the main reaction-mixing channel 502.

A second collinear annulus assemblage 507 as shown in FIG. 5 illustrates the internal pass configuration between the two annuli 501 and 507 of the five channels 502-506 that would normally be voids enclosed within the monolithic block 508. The monolithic overburden 508 is cut away in order to clearly show the channel arrangement. The five channels 502-506 connect respective channels in the second annulus assemblage 507 and in this embodiment channels have protuberances that interlock 509 with corresponding cavities in adjoining channels.

Educt fluids in segregated channels must mix to initiate reaction combinations. Multiple helical flows 501-504 produce high shear forces, which in turn serve multiple functions, including better mixing and advantageous wall scouring. Moreover, the high-shear flow patterns flush channel walls of adhering films, which would otherwise impede flow and thermal transmission. If necessary, the degree of mixing can be intensified and flow laminarity reduced by the addition of static mixing structures within the main reaction channel 505 positioned along the fluidic flow path and/or simply adjusting flow rate and velocity.

Long, serpentine collinearly parallel channels 501-505 offer extremely efficient isothermal control, thereby suitably permitting continuous autogenic operation. Counter-flowing, thermal-exchange fluids in the channels also provide necessary start-up heat, whereby start-up temperature initiates a reaction. Conversely, thermal energy is harvested via exchange fluid after the reaction becomes fully autogenic. Helically serpentine, collinear tubular flow regimes are also especially advantageous for processing high-exegetic reactants under exothermic autogenic conditions, wherein the monolith temperature rises at the axial center while remaining cool at the radial perimeter. The thicker outer wall contains the pressure for the overall apparatus without being subjected to elevated temperatures generated at the center of the device. The channel injection dynamics can be reversed for isothermal management of endothermic reactions.

As shown in FIG. 6 the outer surrounding channels, in this case the lower interior of the square profile configuration can be precisely reflected in order to connect 601 a channel in one annulus 602 to the corresponding channel in the next 603 in order to tightly axially coil around the center of the reactor, thereby increasing the run length of the channels while decreasing the overall size of the reactor needed to complete this run length.

As shown in FIG. 7 the main reaction-mixing channel is also precisely reflected to connect 701 a channel in one annulus 702 to the corresponding channel in the next annulus 703 in order to tightly axially coil around the center of the reactor in a somewhat oscillatory manner while maintaining collinear paths. The connected channel assemblages maintain proximally parallel paths to that of the main reaction mixing channel, thereby nesting the annular structures within each other, facilitating efficient heat transfer and reaction efficiency.

Such nestling in shown in FIG. 8 wherein the lower-exterior outer channel internal pass connects 801 a channel in one annulus 802 to the corresponding channel in the next annulus 803.

FIG. 9 illustrates the upper-interior outer channel making its internal pass connects 901 a channel in one annulus 902 to the corresponding channel in the next annulus 903.

Finally, as reflected in FIG. 10 all five collinear fluid channels 1001 complete the connection between two annular assemblages 1002-1003 and are enclosed as shown in FIG. 11 within the monolithic reactor body 1101. Note that FIGS. 5-11 also exemplarily illustrate a turn point where annular assemblages of collinear channels connect to an adjoining assemblage sets.

One simple variant as shown in FIG. 12 of the square-profile embodiment divides the square pattern at the vertices 1201 rather than in the middle of each side, thereby differentiating the four separate outer channels as generally triangularly-shaped channels. Like other embodiments and variants, this configuration has round recesses 1202 scalloped into each of the four channels to accommodate close spacing with the center main reaction channel 1203.

A third exemplary embodiment as shown in FIG. 13 comprises a circular channel profile 1301, again with the main reaction mixing channel at the center 1302 surrounded by one or more other channels. This embodiment advantageously lends itself to helically twisting the outer channels 1303 around the central main reaction channel, thereby improving energetic transfer between the channels and increasing linear paths of the surrounding channels within the same physical space. The circular assemblage (whether helically twisted 1303 or not 1301) also readily lends to nesting within other assemblages due to its generally round configuration.

Circular channel profiles exemplarily shown earlier in FIG. 14 can also be configured (whether helically twisted or not) to overlap or interlock.

The apparatus channel profiles may take the form of any embodiment. Exemplary embodiments of the apparatus channels as shown in FIG. 14 can have varied configurations. The abridged selection of exemplary profile, cross-sections illustrates the point that there is no preferred embodiment, due to the fact that different designs can serve many purposes. Some are triangular 1401, 1402, 1403, some circular 1404, 1405, 1406, some square 1407, 1408, 1409, some overlapping 1402, 1405, 1408, and some interlocking 1403, 1406, 1409.

Some proximal channel embodiments herein (particularly triangular orientations) as shown in FIG. 15 allow cross-sectional geometric profiles of each concentrically successive layer to be axially nested or overlapping, with one annual spiral overlapping with another thereby (shown with the gap exaggerated for illustrative purposes) resembling threads of a bolt in a nut 1501. Overlapping annular layers structurally aid axial control of heat transfer, either towards or away from the center of the apparatus. At the end of each annular layer, a collinear channel assemblage turns back into the next concentric layer along shared edges of their adjoining profiles, thereby creating comparably similar annular structures of oscillating axial arcs and coils. Each concentric, multichannel assemblage axially coils or axially oscillates around the center of the monolith forming axially concentric layers. The close spacing and inherent nesting of adjoining annular channel layers improves construction-material-demand efficiencies. Furthermore, the apparatus vastly simplifies construction methods by lending itself to additive manufacturing methods.

Exemplary embodiments herein and as shown in FIG. 16 have an even number of annular passes (twelve total in this particular illustrative embodiment), thereby creating an even number of annular, concentric layers 1601. Even-numbered, annular-structure designs advantageously lend themselves to input and output ports 1602 on the same axial end of the apparatus 1603. Ostensibly, the design can be easily configured to produce an odd number of concentric annular layers, whereby such an embodiment modification would advantageously lend itself to input and output ports on opposite ends of the apparatus.

Fluid flow within any given annular layer embodiment generally proceeds from one axial end of the device toward the other axial end and then connect to successive annular, channel layers via precise bends. Channels in the exemplary embodiments of FIGS. 5-11 are helical forms so as to impart changes in direction to the fluids for adjoining collinear channel assemblage annuli. Channels share walls, which in turn behave as fluidic containment boundaries as well as direct-contact, thermal-transfer conductors, thereby serving as thermal exchange interface surfaces between the separate fluids.

Annular layers as shown in FIG. 17 create very long, continuous channels 1701 (only the main reaction mixing channel is shown) with correspondingly high surface areas in a compact space 1702, thereby accommodating tunable fluidic velocities coupled with very low thermal losses. Each channel has separate inlet and outlet ports 1703 which can accommodate standard compression fittings or other suitable connections.

Each radially concentric, annular assemblage layer as shown in FIG. 18 folds into the adjacent layer 1801, thereby reversing the fluid flow direction with each successive layer, with four annular layers shown in this example 1802. Therefore, fluids flow in the opposite direction between any two respectively adjacent radially concentric layers 1801. The linear flow direction of one channel (only the main reaction mixing channel is shown for clarity), would be generally a directional oscillation as it progresses from one annular coil assemblage 1803 to the next 1804, meaning that the flow would reverse rotationally from clockwise to counterclockwise and back again as it proceeds from the input port 1805 until to the respective output port 1806. Closely spaced, parallel-channel orientations allow efficient energetic transfer when two adjacent channels have fluidic flows in opposite directions. Concentric annular layers structurally aid radial thermal energetic redistribution, either towards or away from the center of the apparatus.

Exemplary embodiments contained herein provide advantageously thin, internal shared walls between collinear, helical annular channels, thereby using less than half of the material that would be required to produce a similarly functioning device by traditional bending, coiling, and welding. Automated production via additive manufacturing reduces production man-hours for a similar tubular arrangement by orders of magnitude, thereby creating a significant economic savings. Furthermore, serpentine channel structures integrated into a monolithic block are preferentially produced via additive manufacturing, thereby offering advanced production methods not possible via traditional bending, coiling, and welding methods.

High temperatures and high pressures are readily contained within very thin walled fluid channels embodied herein, which are adequate due to the singularly thick outer monolith wall. The relatively thick, outer pressure-containment monolith wall advantageously allows the much thinner, internal, shared channel walls to safely contain potentially very high fluid temperatures (e.g., >800 C) and potentially very high pressures (e.g., >10K psi).

Individual channel wall thicknesses would need to be much thicker to contain those same high temperatures and high pressures if the same complex geometries were produced in stand-alone, bent, coiled, and welded tubing, and notably those thicker walls would not be shared by more than one tube. The combination of helical gyrations and oscillations solves problems associated with annular reactors by providing a stronger, lighter, more compact, safer, and simpler design. The design provides for much easier, entirely automated construction of a system with continuous annular in-line flow, which is easily incorporated and controlled via a much more efficiently modular annular structure. Furthermore, additively manufacturing the monolith allows for any desired fluid channel shape and dimensions, which would be nearly impossible to manufacture via traditional tube production and pipefitting processes.

Collectively, monolith features resulting from the additive-manufacturing-enabled design substantially lower capital costs, vastly reducing the footprint of the physical form, and uniquely facilitating portable applications. Additively manufactured monolithic reaction containment apparatuses with customizable, internal serpentine channel geometries also allow for more efficient operation.

The invention claimed is:
1. A reaction containment and control apparatus comprising:
  a. a monolithic structure;
  b. a first plurality of internal functional voids configured to channel fluid, wherein each internal functional void of the first plurality of internal voids comprises a respective inlet port and a respective outlet port;
  c. a second plurality of internal functional voids configured to mix reactants; and d. an internal configuration comprising the first plurality of internal functional voids and the second plurality of internal voids, wherein the first plurality of internal voids are collinearly adjoined in parallel, wherein the second plurality of internal voids are collinearly serpentine, wherein the reactants flow through each internal functional void of the second plurality of internal functional voids separately, wherein, based on a respective inner-wall thickness and an outer-wall shared with another internal functional void of the first plurality of internal functional voids, each internal functional void of the first plurality of internal functional voids is configured to distribute pressure, wherein, based on a respective inner-wall thickness and an outer-wall shared with another internal functional void of the second plurality of internal functional voids, each internal functional void of the second plurality of internal functional voids is configured to distribute pressure.

2. The apparatus of claim 1, wherein, based on a construction material of the apparatus, an operational pressure associated with the apparatus is up to 10,000 psi and an operational temperature associated with the apparatus is up to 1300° C.

3. The apparatus of claim 1, wherein the monolithic structure is one or more of porous, or non-porous.

4. The apparatus of claim 1, wherein the monolithic structure is constructed from one or more of metal, ceramic, sapphire, quartz, or plastic.

5. The apparatus of claim 1, further comprising one or more auxiliary channels, wherein energy is transferred between one or more fluids flowing through the one or more auxiliary channels.

6. The apparatus of claim 1, wherein the annularly nested linear geometric patterns comprise one or more of spiral within spiral within spiral patterns, zigzag patterns, helical patterns, rectangular spiral patterns, corkscrew patterns, oscillatory patterns, coiling patterns, curving patterns, twisting patterns, winding patterns, sinuous patterns, or circuitously torturous patterns.

7. The apparatus of claim 1, further comprising a third plurality of internal functional voids configured to channel one or more energy-transfer fluids, ionic fluids, or molten metals, wherein one or more of the energy-transfer fluids, ionic fluids, or molten metals thermally regulate the apparatus.

8. The apparatus of claim 1, further comprising additional internal functional voids.

9. The apparatus of claim 8, wherein the additional internal functional voids are customizable based on one or more of strength, spatial conformity, counter-flow, compactness, mass transfer, heat transfer, energy transfer, flow laminarity, flow annularity, shear forces, flow restrictions, pinch points, textures, or smoothness.

10. The apparatus of claim 8, wherein the additional internal functional voids comprise one or more annularly nested linear geometric patterns along a longitudinal path axis.

11. The apparatus of claim 8, wherein the additional internal functional voids, based on an inner-wall thickness associated with each internal functional void of the additional internal functional voids and an outer-wall shared with another internal functional void of the additional internal functional voids, are configured to distribute pressure between the additional internal functional voids.

12. The apparatus of claim 1, wherein the apparatus is further configured to operate as one or more of a gasification device, a catalytic-reaction device, a molten-salt fissile device, a Fischer-Tropsch process gas-to-liquid hydrocarbon-upgrading device, a supercritical-solvation device, an extraction device, or a flow-through thermokinetic calorimeter.

13. The apparatus of claim 1, wherein the apparatus if further configured for a flow regime, wherein the flow regime comprises one or more of bubble flow, plug flow, or annular flow.

14. An apparatus comprising:
a. a monolithic structure;
b. a first plurality of internal functional voids configured to channel fluid, wherein each internal functional void of the first plurality of internal voids comprises a respective inlet port and a respective outlet port;
c. a second plurality of internal functional voids;
d. an internal configuration comprising the first plurality of internal functional voids and the second plurality of internal voids, wherein the first plurality of internal voids are collinearly adjoined in parallel, wherein the second plurality of internal voids comprise one or more annularly nested linear geometric patterns along a longitudinal path axis, wherein, based on a respective inner-wall thickness and an outer-wall shared with another internal functional void of the first plurality of internal functional voids, each internal functional void of the first plurality of internal functional void is configured to distribute pressure, wherein, based on a respective inner-wall thickness and an outer-wall shared with another internal functional void of the second plurality of internal functional voids, each internal functional void of the second plurality of internal functional voids is configured to distribute pressure.

15. The apparatus of claim 14, wherein the annularly nested linear geometric patterns comprise one or more of spiral within spiral within spiral patterns, zigzag patterns, helical patterns, rectangular spiral patterns, corkscrew patterns, oscillatory patterns, coiling patterns, curving patterns, twisting patterns, winding patterns, sinuous patterns, or circuitously torturous patterns.

16. The apparatus of claim 14, wherein the apparatus is configured to contain a reaction.

17. The apparatus of claim 14, wherein the apparatus is further configured to operate as one or more of a gasification device, a catalytic-reaction device, a molten-salt fissile device, a Fischer-Tropsch process gas-to-liquid hydrocarbon-upgrading device, a supercritical-solvation device, an extraction device, or a flow-through thermokinetic calorimeter.

18. The apparatus of claim 14, wherein the apparatus if further configured for a flow regime, wherein the flow regime comprises one or more of bubble flow, plug flow, or annular flow.

19. The apparatus of claim 14, further comprising additional internal functional voids configured to mix reactants.

20. The apparatus of claim 19, wherein the additional internal functional voids are collinearly serpentine, wherein the reactants flow through each internal functional void of the additional internal functional voids separately, wherein the additional internal functional voids, based on an inner-wall thickness associated with each internal functional void of the additional internal functional voids and an outer-wall shared with another internal functional void of the additional internal functional voids, are configured to distribute pressure between the additional internal functional voids.

* * * * *